US006125081A

United States Patent [19]

Flynn

[11] Patent Number: 6,125,081

[45] Date of Patent: Sep. 26, 2000

[54] GOLFER'S WRISTWATCH WITH SCORE KEEPING CAPABILITIES

[76] Inventor: Firman J. Flynn, 13 Foreht Cres, Aurora, Ontario, Canada, L4G 3E7

[21] Appl. No.: 08/526,206

[22] Filed: Sep. 11, 1995

[51] Int. Cl.[7] .......... G04B 47/00; G04C 19/00; G06F 15/44; G06F 16/00

[52] U.S. Cl. .......... 368/10; 368/82; 377/5; 473/131; 473/213

[58] Field of Search .......... 368/1, 3, 10, 82, 368/107, 113; 364/411; 377/5; 473/131, 213

[56] References Cited

U.S. PATENT DOCUMENTS 4,864,592 9/1989 Lee .......... 377/5
5,335,212 8/1994 Bartos .......... 368/107
5,353,439 10/1994 Kurtz et al. .......... 2/160
5,357,487 10/1994 Coleman, III .......... 368/10
5,550,884 8/1996 Merney .......... 377/5
5,683,303 11/1997 Lambourne .......... 473/131

*Primary Examiner*—Vit Miska

[57] ABSTRACT

A golfer's wristwatch with score keeping capabilities comprising: a watch component including a front face, a watch case, time display means and a plurality of side edges; the front face of the watch component including a liquid crystal display window, the display window including a plurality of player numerals, the display window also including stroke count means displayed numerically adjacent to the player numerals, a side edge of the watch case including a time adjustment knob and a player indicator knob, the player indicator knob being operatively coupled to the numerals of the display window to highlight a specific player numeral, a stroke count button being operatively coupled to the stroke count means of the display window whereby each depression of the button causing the addition of one stroke to a player's score, the player's cumulative score being displayed in the display window; and a wrist band to permit coupling of the apparatus around a user's wrist.

4 Claims, 3 Drawing Sheets

GOLFER'S WRISTWATCH WITH SCORE KEEPING CAPABILITIES

BACKGROUND OF THE INVENTION

1. Field of the Invention

The present invention relates to a golfer's wristwatch with score keeping capabilities and more particularly pertains to depressing the stroke count button of the apparatus to maintain a running total of each player's score.

2. Description of the Prior Art

The use of sports theme watches is known in the prior art. More specifically, sports theme watches heretofore devised and utilized for the purpose of displaying time while participating in sporting events are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. Des. 335,458 to Balaban a golf theme clock.

U.S. Pat. No. Des. 283,874 to Fontannaz discloses a clock with golf club.

U.S. Pat. No. Des. 282,912 to Clepea discloses a golf clock.

U.S. Pat. No. Des. 348,843 to De Sanctis discloses a watch.

U.S. Pat. No. Des. 349,245 to Hersch discloses a baseball cap watch.

Lastly, U.S. Pat. No. Des. 325,349 to Perri discloses an informational sport clock.

In this respect, the golfer's wristwatch with score keeping capabilities according to the present invention substantially departs from the conventional concepts and designs of the prior art, and in doing so provides an apparatus primarily developed for the purpose of depressing the stroke count button of the apparatus to maintain a running total of each player's score.

Therefore, it can be appreciated that there exists a continuing need for a new and improved golfer's wristwatch with score keeping capabilities which can be used for depressing the stroke count button of the apparatus to maintain a running total of each player's score. In this regard, the present invention substantially fulfills this need.

SUMMARY OF THE INVENTION

In view of the foregoing disadvantages inherent in the known types of sports theme watches now present in the prior art, the present invention provides an improved golfer's wristwatch with score keeping capabilities. As such, the general purpose of the present invention, which will be described subsequently in greater detail, is to provide a new and improved golfer's wristwatch with score keeping capabilities and method which has all the advantages of the prior art and none of the disadvantages.

To attain this, the present invention essentially comprises a new and improved golfer's wristwatch with score keeping capabilities comprising, in combination: a watch component formed in a generally cylindrical configuration with a front face and a rear portion formed as a watch case, the watch case including an upwardly projecting rod and various components required to rotate the rod a consistent distance at periodic intervals, the front face having an upper region, a lower region and an arcuate transparent outer covering, the upper region including a generally circular shaped section, time interval markings being positioned adjacent to the perimeter of the circular shaped section, the circular shaped section having a central region including a decorative golf design, the rod of the watch case extending upwardly through the approximate center point of the circular shaped section; a golf club shaped minute hand being affixed to the rod of the watch case, an hour hand having a first end pivotally coupled to the rod and a second end, a miniature golf ball being affixed to a second end of the hour hand, the watch component having two rounded side walls and two linear side walls, a first rounded side wall including a time adjustment knob operatively coupled to the rod of the watch case, the time adjustment knob enabling users to adjust the hands of the watch component by turning the knob; the lower region of the front face of the watch component including a generally rectangular shaped liquid crystal display window, the display window including player numerals 1, 2, 3 and 4 positioned vertically therein, the player numerals corresponding to players in a golf game, the display window also including stroke count means displayed numerically adjacent to the player numerals, the first side edge of the watch case including a player indicator knob operatively coupled to the numerals of the display window to highlight a specific player numeral, a stroke count button having a semispherical shaped outer section and an elongated cylindrical inner section, the outer section extending through the transparent covering and including a dimpled surface, the inner section extending through the lower region of the front face of the watch and within the watch case, the inner section being operatively coupled to the stroke count means of the display window whereby each depression of the button causing the addition of one stroke to a player's score, the player's cumulative score being displayed in the display window; and a wrist band including a first strap and a second strap, each strap having an inboard end and an outboard end, the inboard end of each strap being affixed to the linear side wall of the watch component, the outboard end of the first strap including a buckle device, the outboard end of the second strap including a plurality of holes, in an operative orientation users positioning the apparatus around a wrist and adjustable coupling the outboard ends of the straps.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved golfer's wristwatch with score keeping capabilities which has all of the advantages of the prior art sports theme watches and none of the disadvantages.

It is another object of the present invention to provide a new and improved golfer's wristwatch with score keeping capabilities which may be easily and efficiently manufactured and marketed.

It is further object of the present invention to provide a new and improved golfer's wristwatch with score keeping capabilities which is of durable and reliable constructions.

An even further object of the present invention is to provide a new and improved golfer's wristwatch with score keeping capabilities which is susceptible of a low cost of manufacture with regard to both materials and labor, and which accordingly is then susceptible of low prices of sale to the consuming public, thereby making such golfer's wristwatch with score keeping capabilities economically available to the buying public.

Still yet another object of the present invention is to provide a new and improved golfer's wristwatch with score keeping capabilities which provides in the apparatuses and methods of the prior art some of the advantages thereof, while simultaneously overcoming some of the disadvantages normally associated therewith.

Still another object of the present invention is to depress the stroke count button of the apparatus to maintain a running total of each player's score.

Lastly, it is an object of the present invention to provide a new and improved a golfer's wristwatch with score keeping capabilities comprising: a watch component including a front face, a watch case, time display means and a plurality of side edges; the front face of the watch component including a liquid crystal display window, the display window including a plurality of player numerals, the display window also including stroke count means displayed numerically adjacent to the player numerals, a side edge of the watch case including a time adjustment knob and a player indicator knob, the player indicator knob being operatively coupled to the numerals of the display window to highlight a specific player numeral, a stroke count button being operatively coupled to the stroke count means of the display window whereby each depression of the button causing the addition of one stroke to a player's score, the player's cumulative score being displayed in the display window; and a wrist band to permit coupling of the apparatus around a user's wrist.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is taken along section line 6—6 of FIG. 5.

The same reference numerals refer to the same parts through the various Figures.

DESCRIPTION OF THE PREFERRED EMBODIMENT

Figure 4:
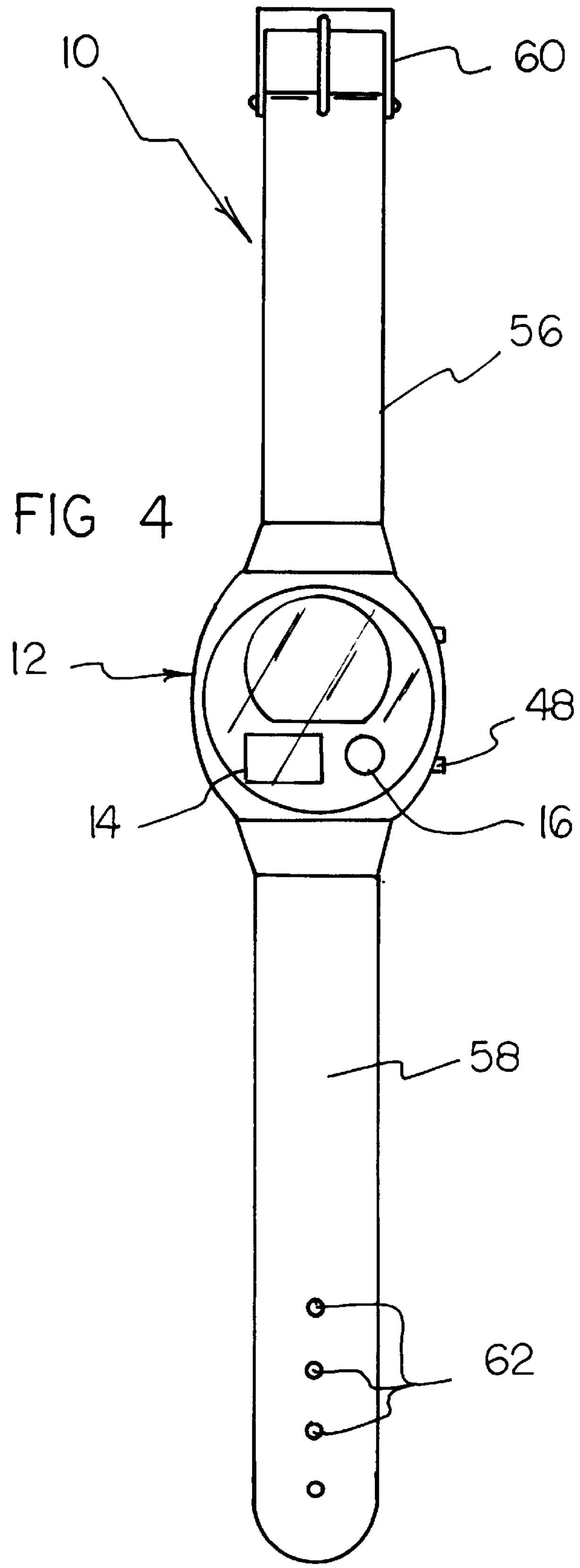
FIG. 4 is a perspective view of the preferred embodiment of the golfer's wristwatch with score keeping capabilities constructed in accordance with the principles of the present invention.
Figure 5:
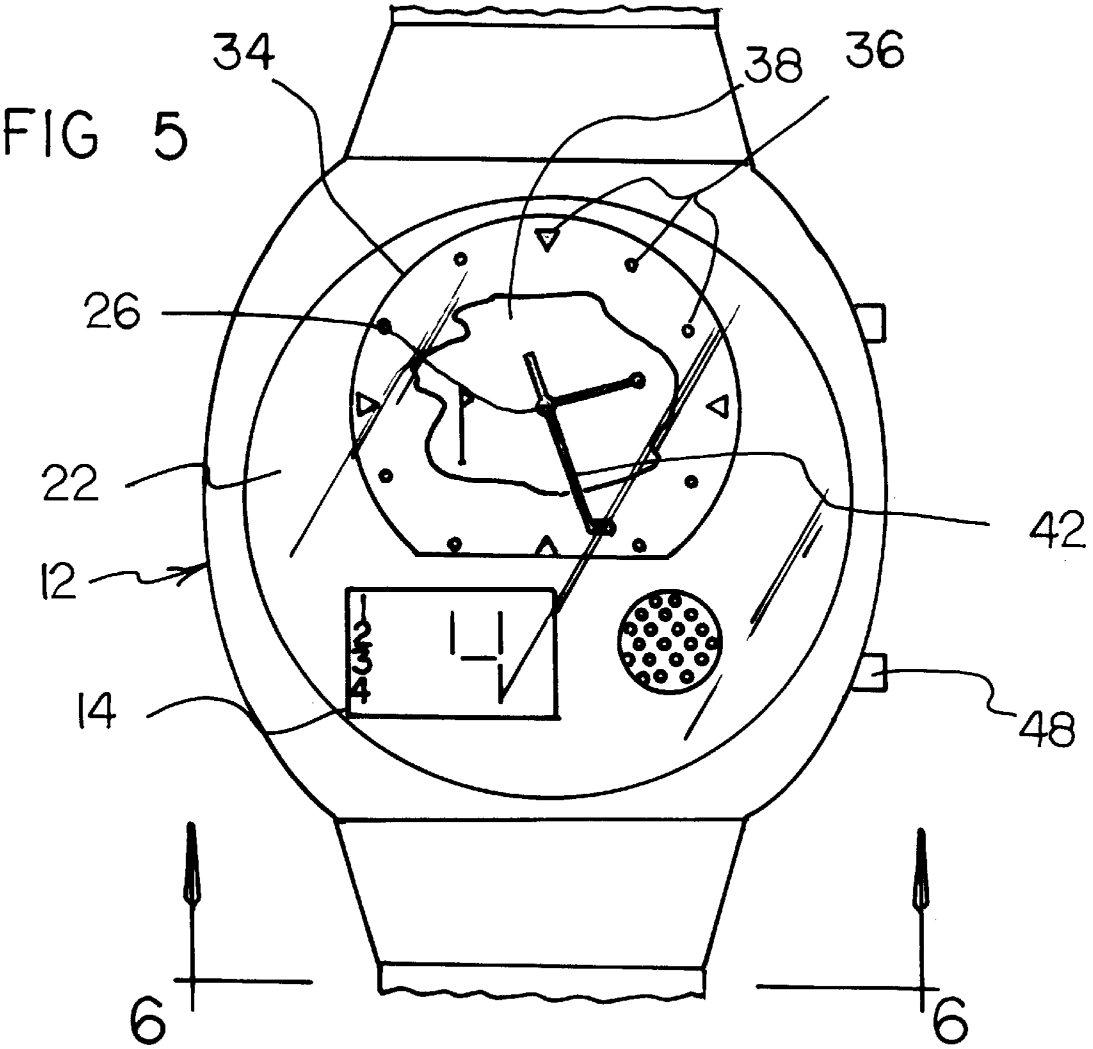
FIG. 5 is an enlarged isolated perspective view of the face of the watch component shown in FIG. 4.
Figure 6:
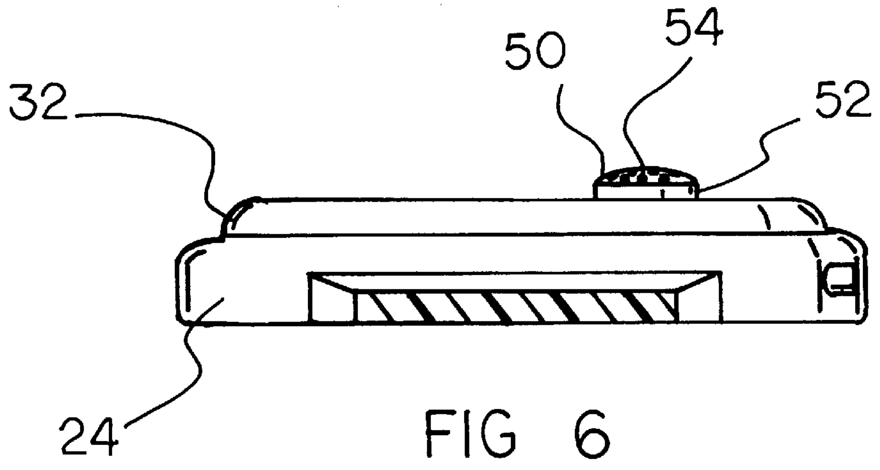
FIG. 6 is a side perspective view of the watch component shown in FIG. 5 illustrating the watch case, watch face and stroke count button of the apparatus.

With reference now to the drawings, and in particular to FIGS. 4–6 thereof, the preferred embodiment of the new and improved golfer's wristwatch with score keeping capabilities embodying the principles and concepts of the present invention and generally designated by the reference numeral 10 will be described.

The present invention, the golfer's wristwatch with score keeping capabilities 10 is comprised of a plurality of components. Such components in their broadest context include a watch component 12, a liquid crystal display window 14, a stroke count button 16 and a wrist band 18. Such components are individually configured and correlated with respect to each other so as to attain the desired objective.

More specifically, a watch component 12 is formed in a generally cylindrical configuration with a front face 22 and a rear portion 24 formed as a watch case. The watch case is fabricated of either metal or plastic in the preferred embodiment. The watch case includes an upwardly projecting rod 26 and various components required to rotate the rod a consistent distance at periodic intervals. The rotation of the rod corresponds to the positioning of the time interval markings adjacent to the perimeter of the central section. Note FIGS. 4 and 5.

The front face has an upper region, a lower region and an arcuate transparent outer covering 32. The upper region includes a generally circular shaped section 34. Time interval markings 36 are positioned adjacent to the perimeter of the circular shaped section. The rotation of the rod corresponds to the positioning of the time interval markings on the watch face. As illustrated in FIGS. 4–6, the circular shaped section has a central region 38 that includes a decorative golf design. The decorative golf design includes a circular region with curved irregular edges to approximate the configuration of a putting green. The putting green includes a flag extending from the hole of the green. Note FIG. 5.

Figure 1:
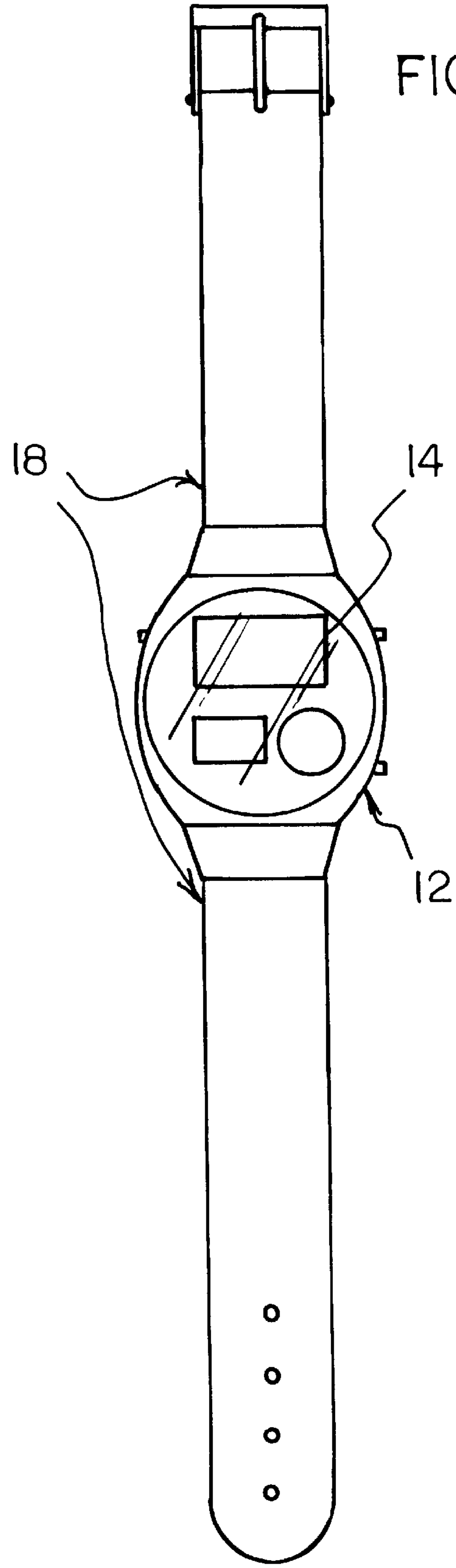
FIG. 1 is a perspective view of an alternative embodiment of the golfer's wristwatch with score keeping capabilities constructed in accordance with the principle of the present invention.
Figure 2:
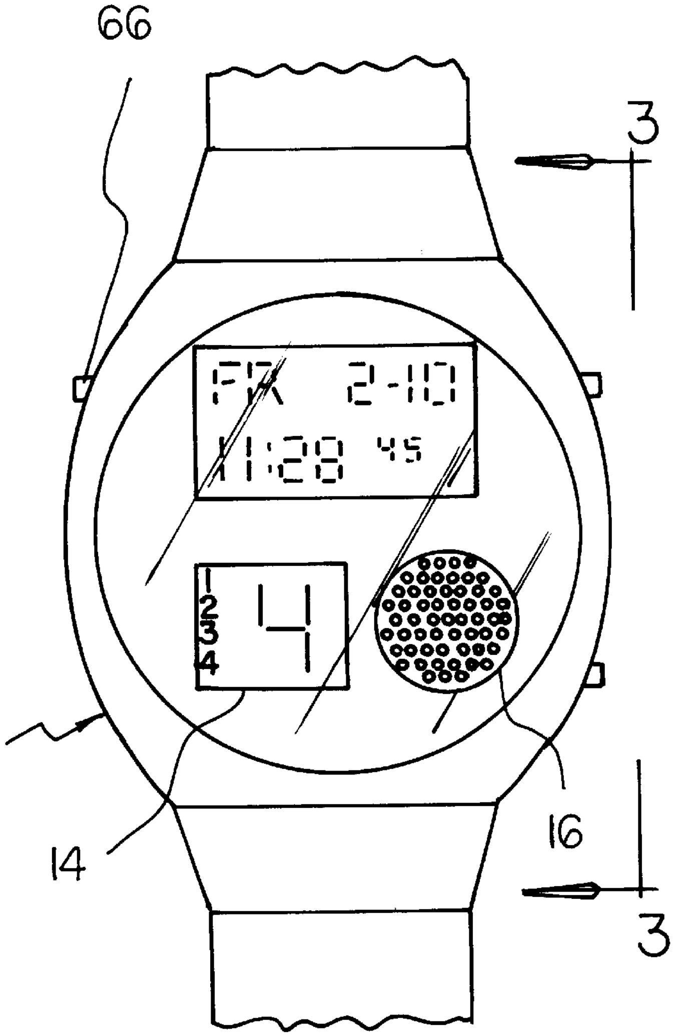
FIG. 2 is an enlarged isolated perspective view of the face of the watch component of the apparatus shown in FIG. 1.
Figure 3:
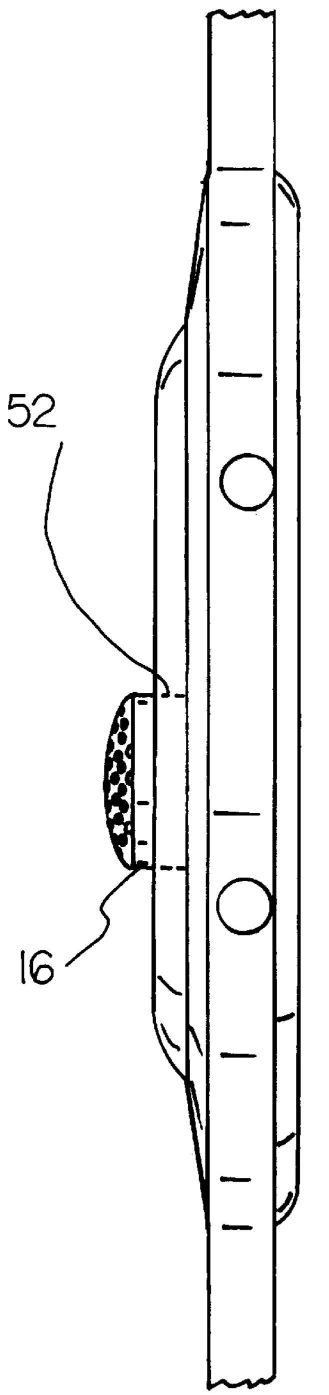
FIG. 3 is a side perspective view of the watch component shown in FIG. 2 illustrating the watch case, watch face and stroke count button of the apparatus.

An alternative embodiment of the apparatus is illustrated in FIGS. 1–3. In such embodiment the upper region of the watch face includes a generally rectangular shaped section. The generally rectangular shaped section includes digital time, date and function displays. The additional functions are controlled by a function adjustment button 66 positioned in a second side wall of the watch case. Note FIGS. 1–3.

A golf club shaped minute hand 42 is affixed to the rod of the watch case. The club is of sufficient length to extend from the rod to a point adjacent to the time interval markings. An hour hand 44 has a first end pivotally coupled to the rod. A miniature golf ball is affixed to a second end of the hour hand. The hour hand is significantly shorter than the golf club and extends approximately fifty percent of the distance between the rod and the time interval markings. Note FIG. 5.

The watch component has two rounded side walls and two linear side walls. In an operative orientation the watch component will be positioned upon the user's wrist with the linear side walls positioned perpendicular to the axis of the user's arm. A first rounded side wall includes a time adjustment knob operatively coupled to the rod of the watch case. The time adjustment knob enables users to adjust the hands of the watch component by turning the knob. Note FIGS. 4 and 5. In the alternative embodiment of the apparatus shown in FIGS. 1–3, the time adjustment knob is operatively coupled to the digital time display.

The lower region of the front face of the watch component includes a generally rectangular shaped liquid crystal display window 14. The display window includes player numerals 1, 2, 3 and 4 positioned vertically therein. The player numerals correspond to players in a golf game. This mirrors the number of players in a typical golf game. The numerals are indicated vertically on the left hand side of the display window. Note FIG. 2, 4 and 5.

The display window also includes stroke count means displayed numerically adjacent to the player numerals. The first side edge of the watch case includes a player indicator knob 48 operatively coupled to the numerals of the display window to highlight a specific player numeral. When a player's turn is in effect the user simply turns the player indicator knob to that player's corresponding numeral. After the player's turn is over the player's stroke count is stored. A stroke count button 16 has a semispherical shaped outer section and an elongated cylindrical inner section 52. The outer section extends through the transparent covering and includes a dimpled surface 54. The dimpled outer surface simulates the appearance of a golf ball. Note FIGS. 2, 3, 5 and 6.

The inner section extends through the lower region of the front face of the watch and within the watch case. The inner section is operatively coupled to the stroke count means of the display window whereby each depression of the button causes the addition of one stroke to a player's score. The player's cumulative score is displayed in the display window. In one embodiment of the apparatus the stroke counts for each of the players are transferred to a written score card at the completion of each hole. This may be accomplished while travelling in a golf cart or walking to the next hole. In an alternative embodiment of the apparatus the stroke count means tally cumulative scores for the entire game. Note FIG. 5.

A wrist band 18 is composed of a first strap 56 and a second strap 58. Each strap has an inboard end and an outboard end. The inboard end of each strap is affixed to the linear side wall of the watch component. The outboard end of the first strap includes a buckle device 60. The outboard end of the second strap includes a plurality of holes 62. In an operative orientation users position the apparatus around a wrist and adjustable couple the outboard ends of the straps. The band is sufficiently long and includes a sufficient number of holes to permit users having a plurality of differently sized wrists to wear the apparatus. Alternatively, the apparatus may be stored in a user's pocket to avoid interference with his golf swing. Note FIGS. 1 and 4.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

What is claimed as being new and desired to be protected by LETTERS PATENT of the United States is as follows:

1. A golfer's wristwatch with score keeping capabilities comprising, in combination:

a watch component formed in a generally cylindrical configuration with a front face and a rear portion formed as a watch case, the watch case including an upwardly projecting rod and various components required to rotate the rod a consistent distance at periodic intervals, the front face having an upper region, a lower region and an arcuate transparent outer covering, the upper region including a generally circular shaped section, time interval markings being positioned adjacent to the perimeter of the circular shaped section, the circular shaped section having a central region including a decorative golf design, the rod of the watch case extending upwardly through the approximate center point of the circular shaped section;

a golf club shaped minute hand being affixed to the rod of the watch case, an hour hand having a first end pivotally coupled to the rod and a second end, a miniature golf ball being affixed to a second end of the hour hand, the watch component having two rounded side walls and two linear side walls, a first rounded side wall including a time adjustment knob operatively coupled to the rod of the watch case, the time adjustment knob enabling users to adjust the hands of the watch component by turning the knob;

the lower region of the front face of the watch component including a generally rectangular shaped liquid crystal display window, the display window including player numerals 1, 2, 3 and 4 positioned vertically therein, the player numerals corresponding to players in a golf game, the display window also including stroke count means displayed numerically adjacent to the player numerals, the first side edge of the watch case including a player indicator knob operatively coupled to the numerals of the display window to highlight a specific player numeral, a stroke count button having a semi-spherical shaped outer section and an elongated cylindrical inner section, the outer section extending through the transparent covering and including a dimpled surface, the inner section extending through the lower region of the front face of the watch and within the watch case, the inner section being operatively coupled to the stroke count means of the display window whereby each depression of the button causing the addition of one stroke to a player's score, the player's cumulative score being displayed in the display window; and a wrist band including a first strap and a second strap, each strap having an inboard end and an outboard end, the inboard end of each strap being affixed to the linear side wall of the watch component, the outboard end of the first strap including a buckle device, the outboard end of the second strap including a plurality of holes, in an operative orientation users positioning the apparatus around a wrist and adjustable coupling the outboard ends of the straps.

2. A golfer's wristwatch with score keeping capabilities comprising:

a watch component including a front face, a watch case, time display means and a plurality of side edges;

the front face of the watch component including a liquid crystal display window, the display window including a plurality of player numerals, the display window also including stroke count means displayed numerically adjacent to the player numerals, a side edge of the watch case including a time adjustment knob and a player indicator knob, the player indicator knob being operatively coupled to the numerals of the display window to highlight a specific player numeral, a stroke count button being operatively coupled to the stroke count means of the display window whereby each depression of the button causing the addition of one stroke to a player's score, the player's cumulative score being displayed in the display window; and a wrist band to permit coupling of the apparatus around a user's wrist.

3. The golfer's wristwatch with score keeping capabilities as set forth in claim 2 wherein the watch case includes an upwardly projecting rod and various components required to rotate the rod a consistent distance at periodic intervals, the front face of the watch component having an upper region, a lower region and an arcuate transparent outer covering, the upper region including a generally circular shaped section, time interval markings being positioned adjacent to the perimeter of the circular shaped section, the circular shaped section having a central region including a decorative golf design, the rod of the watch case extending upwardly through the approximate center point of the circular shaped section; and a golf club shaped minute hand being affixed to the rod of the watch case, an hour hand having a first end pivotally coupled to the rod and a second end, a miniature golf ball being affixed to the second end of the hour hand, the time adjustment knob being operatively coupled to the rod of the watch case.

4. The golfer's wristwatch with score keeping capabilities as set forth in claim 2 wherein the front face of the watch component has an upper region, a lower region and an arcuate transparent outer covering, the upper region including a generally rectangular shaped section having digital time, date and function displays, the watch component having a second side edge including a function adjustment button positioned therein.

* * * * *